(12) United States Patent
Chen (10) Patent No.: US 8,290,488 B2
(45) Date of Patent: Oct. 16, 2012

(54) SCANNING METHODS AND SYSTEMS FOR WIRELESS NETWORKS

(75) Inventor: Chih-Wen Chen, Hsinchu (TW)

(73) Assignee: Wistron NeWeb Corp., Hsinchu (TW)

( * ) Notice: Subject to any disclaimer, the term of this patent is extended or adjusted under 35 U.S.C. 154(b) by 79 days.

(21) Appl. No.: 12/941,285

(22) Filed: Nov. 8, 2010

(65) Prior Publication Data

US 2011/0263251 A1    Oct. 27, 2011

(30) Foreign Application Priority Data

Apr. 23, 2010  (TW) .............................. 99112815 A (51) Int. Cl.
*H04W 4/00* (2009.01)

(52) U.S. Cl. ...................................... 455/434; 455/566

(58) Field of Classification Search .................. 455/434, 455/41.2, 436, 443, 438, 161.1, 552.1, 432.1, 455/439, 450, 566; 370/331, 338, 329, 332, 370/252, 401, 343, 335; 235/383; 701/117
See application file for complete search history.

(56) References Cited

U.S. PATENT DOCUMENTS

| | | | |
|---|---|---|---|
| 5,859,835 A * | 1/1999 | Varma et al. | 370/229 |
| 8,103,764 B2 * | 1/2012 | Aviles | 709/224 |
| 2002/0085516 A1 * | 7/2002 | Bridgelall | 370/329 |
| 2004/0179537 A1 * | 9/2004 | Boyd et al. | 370/395.54 |
| 2005/0068928 A1 * | 3/2005 | Smith et al. | 370/338 |
| 2007/0121596 A1 * | 5/2007 | Kurapati et al. | 370/356 |
| 2011/0211511 A1 * | 9/2011 | Bakthavathsalu et al. | 370/311 |

* cited by examiner

*Primary Examiner* — Jean Gelin
*Assistant Examiner* — Mahendra Patel (57) ABSTRACT

Scanning methods and systems for wireless networks are provided. In response to an operation, at least a waiting time corresponding to a wireless network scanning procedure is changed from a default time length to a predefined time length, and the wireless network scanning procedure is accordingly performed. When the wireless network scanning procedure is terminated, the waiting time is changed from the predefined time length back to the default time length. If a specific wireless access point detected in a second scanning operation is not detected in a first scanning operation, which is performed subsequent to the second scanning operation, an alive count corresponding to the specific wireless access point is subtracted by a predefined value. If the alive count does not equal to a specific value, the specific wireless access point and at least one wireless access point detected in the first scanning operation are displayed.

17 Claims, 5 Drawing Sheets

SCANNING METHODS AND SYSTEMS FOR WIRELESS NETWORKS

CROSS REFERENCE TO RELATED APPLICATIONS

This Application claims priority of Taiwan Patent Application No. 099112815, filed on Apr. 23, 2010, the entirety of which is incorporated by reference herein.

BACKGROUND OF THE INVENTION

1. Field of the Invention

The disclosure relates generally to scanning methods and systems for wireless networks, and more particularly, to methods and systems that perform additional management functions for scanning of access points in wireless networks.

2. Description of the Related Art

With portable devices being popular, applications for wireless networks have become more important and valuable. Related infrastructures, such as access points, must be set up by a service provider of wireless networks, such that users can link and login to the wireless network service via their portable devices. Generally, when users want to link to a wireless network, a wireless network connection module of a portable device must be first activated, such that the wireless network connection module can perform the function of wireless network scanning, in efforts to detect available wireless network providers in a surrounding environment.

The design of functions and modules of a portable device have more limitations and considerations due to the requirements of cost reduction and lower power consumption. For wireless network connection modules, due to the requirement of cost reduction, the size of the embedded memory for the module is always small, such that only a limited number of access points detected in the scanning procedure for wireless networks can be stored in the memory. Additionally, due to the requirement of lower power consumption, only a short period can be stayed for each wireless network channel during the scanning procedure for wireless networks, thus achieving the objective of power saving.

When the scanning procedure for wireless networks is performed in a complex wireless network environment having a large amount of access points, the scanning result (access points for wireless networks) displayed in a scanning interface may be incomplete. For example, only a part of the available access points may be displayed in the interface. The result may be misleading for users, and users may misinterpret the stability of the portable device and the wireless network environment. For example, a specific wireless access point is in the current environment, but the specific wireless access point is not on the list shown on the scanning interface, or a specific wireless access point is detected in the current scanning operation, but the specific wireless access point cannot be detected in the next scanning operation, or at the same location, the scanning results of different scanning operations are not identical. Consequently, the conventional scanning mechanisms for wireless networks may be problematic for users. If so, users may learn to not trust related devices and product, thus influencing the marketing thereof.

BRIEF SUMMARY OF THE INVENTION

Scanning methods and systems for wireless networks are provided.

In an embodiment of a scanning method for wireless networks, an operation is received. In response to the operation, at least a waiting time corresponding to a wireless network scanning procedure is changed from a default time length to a predefined time length, and the wireless network scanning procedure is accordingly performed. When the wireless network scanning procedure is terminated, the waiting time is changed from the predefined time length back to the default time length.

In an embodiment of a scanning method for wireless networks, it is determined whether a specific wireless access point detected in a second scanning operation is also detected in a first scanning operation, wherein the second scanning operation is performed preceding the first scanning operation. If the specific wireless access point detected in the second scanning operation is not detected in the first scanning operation, an alive count corresponding to the specific wireless access point is subtracted by a predefined value, and it is determined whether the alive count equals to a specific value. If the alive count does not equal to the specific value, the specific wireless access point and at least one wireless access point detected in the first scanning operation are displayed via an interface.

An embodiment of a scanning system for wireless networks includes a reception unit, a wireless network connection unit, and a processing unit. The reception unit receives an operation. In response to the operation, the processing unit changes at least a waiting time corresponding to a wireless network scanning procedure from a default time length to a predefined time length, and accordingly performs the wireless network scanning procedure via the wireless network connection unit. When the wireless network scanning procedure is terminated, the processing unit changes the waiting time from the predefined time length back to the default time length.

An embodiment of a scanning system for wireless networks includes a display unit, a wireless network connection unit, and a processing unit. The processing unit performs a first scanning operation via the wireless network connection unit to detect at least one wireless access point in a wireless network. The processing unit determines whether a specific wireless access point detected in a second scanning operation is also detected in the first scanning operation, wherein the second scanning operation is performed preceding the first scanning operation. If the specific wireless access point detected in the second scanning operation is not detected in the first scanning operation, the processing unit subtracts an alive count corresponding to the specific wireless access point by a predefined value, and determines whether the alive count equals to a specific value. If the alive count does not equal to the specific value, the processing unit displays the specific wireless access point and the at least one wireless access point detected in the first scanning operation in an interface via the display unit.

In some embodiments, the alive count corresponding to the wireless access point detected in the first scanning operation can be set as a default value. In some embodiments, when the alive count corresponding to the specific wireless access point equals to the specific value, the specific wireless access point is not displayed in the interface.

In some embodiments, the operation can be used to open a scanning interface for wireless networks. In some embodiments, the wireless network scanning procedure can include an active scanning procedure or a passive scanning procedure, and the waiting time can include a minimum waiting time and/or a maximum waiting time.

Scanning methods for wireless networks may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein:

FIGS. 4 (4A and 4B) is a flowchart of another embodiment of a scanning method for wireless networks of the invention.

DETAILED DESCRIPTION OF THE INVENTION

Scanning methods and systems for wireless networks are provided.

Figure 1:
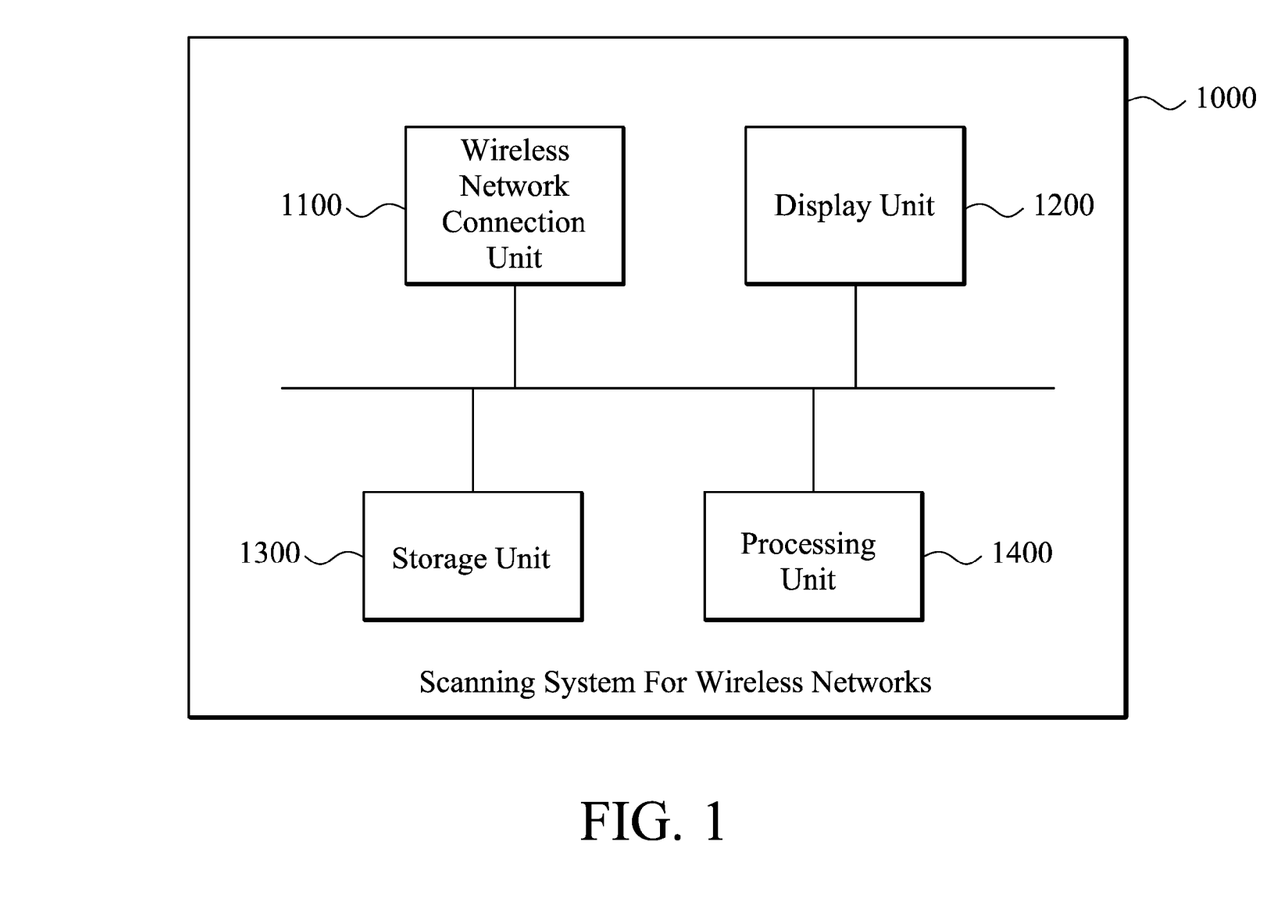
FIG. 1 is a schematic diagram illustrating an embodiment of a scanning system for wireless networks of the invention.

FIG. 1 is a schematic diagram illustrating an embodiment of a scanning system for wireless networks of the invention. The scanning system for wireless networks 1000 can be used in an electronic device having wireless network connection capability, such as a mobile phone, notebook, game host, or any kind of portable devices.

The scanning system for wireless networks 1000 comprises a wireless network connection unit 1100, a display unit 1200, a storage unit 1300, and a processing unit 1400. The wireless network connection unit 1100 can wirelessly detect access points in a surrounding environment, and connect to the access points based on a wireless network scanning procedure, such as an active scanning procedure and/or a passive scanning procedure. The display unit 1200 may be a screen for displaying related data and/or interfaces, such as a scanning interface for wireless networks or related setting interfaces. The storage unit 1300 can store related interfaces, scanning results, and data required for the wireless network scanning. The processing unit 1400 performs the scanning methods for wireless networks of the invention, which will be discussed further in the following paragraphs.

Figure 2:
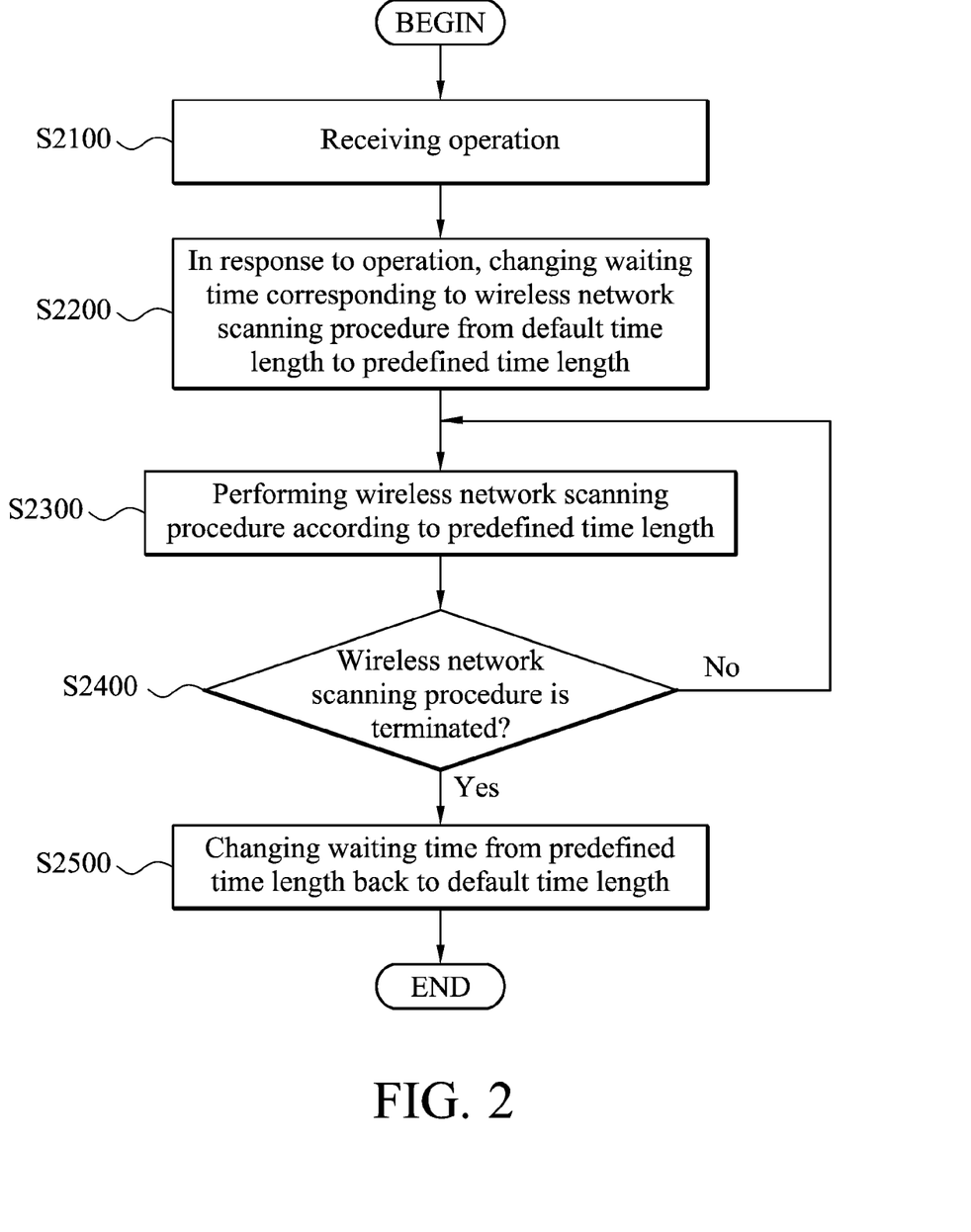
FIG. 2 is a flowchart of an embodiment of a scanning method for wireless networks of the invention.

FIG. 2 is a flowchart of an embodiment of a scanning method for wireless networks of the invention. The scanning method for wireless networks can be used in an electronic device having wireless network connection capability, such as a mobile phone, notebook, game host, or any kind of portable devices. In this embodiment, in response to an operation, the scanning time for each wireless network channel will be adjusted.

In step S2100, an operation is received, and in step S2200, in response to the operation, at least a waiting time corresponding to a wireless network scanning procedure is changed from a default time length to a predefined time length. It is understood that, in some embodiments, the operation may be, the opening of a scanning interface for wireless networks. That is, when the scanning interface for wireless networks is opened by users, step S2200 is performed, such that the waiting time is changed from the default time length to the predefined time length. It is noted that, in some embodiments, the predefined time length may be greater than the default time length, but the present invention is not limited thereto. Additionally, it is understood that, the wireless network scanning procedure may be an active scanning procedure or a passive scanning procedure, and a default minimum waiting time and a default maximum waiting time can be set for the active scanning procedure and the passive scanning procedure, respectively. In some embodiments, the minimum waiting time corresponding to the scanning procedure can be changed from a default minimum waiting time to a predefined minimum waiting time, and the maximum waiting time corresponding to the scanning procedure can be changed from a default maximum waiting time to a predefined maximum waiting time. Additionally, in some embodiments, the above predefined time length (predefined minimum waiting time and/or predefined maximum waiting time) can be set via a user interface. When the waiting time corresponding to the wireless network scanning procedure is set, in step S2300, the wireless network scanning procedure is performed according to the predefined time length, and the scanning result (wireless access point) is displayed. In step S2400, it is determined whether the wireless network scanning procedure is terminated or not. When the wireless network scanning procedure is not terminated (No in step S2400), the procedure remain at step S2300. When the wireless network scanning procedure is terminated (Yes in step S2400), in step S2500, the waiting time corresponding to the wireless network scanning procedure is changed from the predefined time length back to the default time length. For example, the minimum waiting time corresponding to the scanning procedure can be changed from the predefined minimum waiting time back to the default minimum waiting time, and the maximum waiting time corresponding to the scanning procedure can be changed from the predefined maximum waiting time back to the default maximum waiting time.

Figure 3:
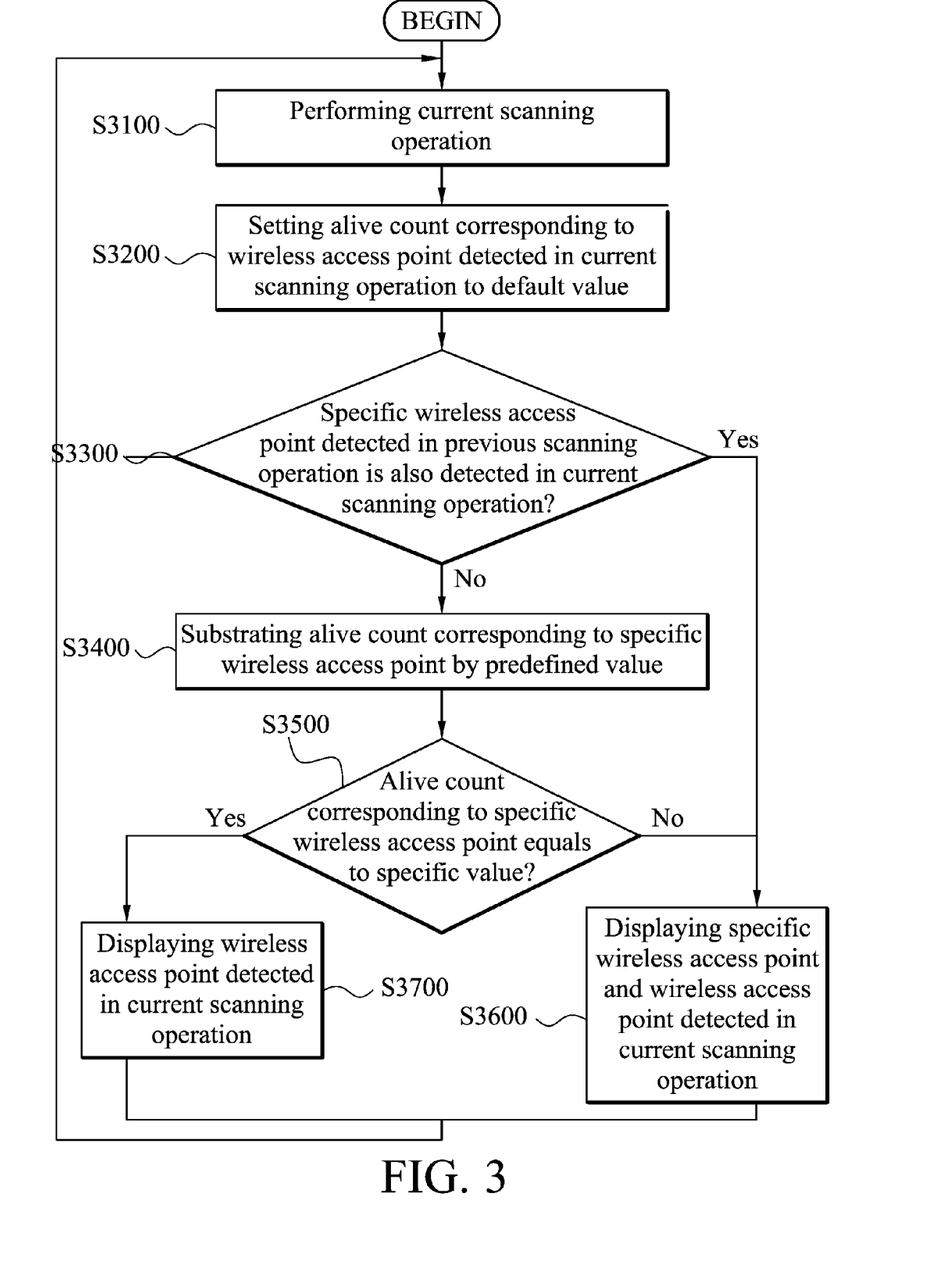
FIG. 3 is a flowchart of another embodiment of a scanning method for wireless networks of the invention.

FIG. 3 is a flowchart of another embodiment of a scanning method for wireless networks of the invention. The scanning method for wireless networks can be used in an electronic device having wireless network connection capability, such as a mobile phone, notebook, game host, or any kind of portable devices. In this embodiment, an alive count can be provided for each wireless access point, and the alive count can be used to determine whether to display the corresponding wireless access point in related interfaces.

In step S3100, a current scanning operation is performed to detect at least one wireless access point in a wireless network. In step S3200, the alive count corresponding to the respective wireless access point detected in the current scanning operation is set to a default value. It is understood that, the default value of the alive count can be adjusted according to various wireless network environments, applications and requirements. In step S3300, it is determined whether at least one specific wireless access point detected in a previous scanning operation preceding the current scanning operation is also detected in the current scanning operation. If the specific wireless access point detected in a previous scanning operation is also detected in the current scanning operation (Yes in step S3300), the procedure goes to step S3600. If the specific wireless access point detected in a previous scanning operation is not detected in the current scanning operation (No in step S3300), in step S3400, the alive count corresponding to the specific wireless access point is subtracted by a predefined value, such as 1, and in step S3500, it is determined whether the alive count equals to a specific value, such as 0. If the alive count does not equal to the specific value (No in step S3500), in step S3600, the specific wireless access point and the at least one wireless access point detected in the current scanning operation are displayed via an interface. If the alive count equals to the specific value (Yes in step S3500), in step S3700, the at least one wireless access point detected in the current scanning operation is displayed via the interface. Then, the procedure returns to step S3100, wherein another scanning operation is performed.

It is noted that, in some embodiments, the system can maintain at least one data list for recording the wireless access points needed to be displayed. In some embodiments, the data list can record the wireless access points/specific wireless access points detected in a previous scanning operation. The wireless access points detected in the current scanning operation will be added to the data list. In the data list, the alive count corresponding to the repeatedly detected wireless access point is updated to the default value, the alive count corresponding to the wireless access point in the data list, which is not detected in the current scanning operation is subtracted by the predefined value, and the wireless access point has the alive count equaling to the specific value will be removed from the data list.

An example follows, wherein the default value corresponding to the alive count is 3, the predefined value is 1, and the specific value is 0. First, it is assumed that the wireless access points detected in a first scanning operation is AP1, AP2 and AP3. The displayed data list includes access points AP1, AP2 and AP3, as follows:

| Name | Access Point ID | Signal Strength | Alive Count | Data List |
|---|---|---|---|---|
| AP1 | 00000001 | −60 dbm | 3 | AP1, AP2, |
| AP2 | 00000002 | −65 dbm | 3 | AP3 |
| AP3 | 00000003 | −82 dbm | 3 | |

It is assumed that the wireless access points detected in a second scanning operation is AP1, AP2, AP4 and AP5, wherein the alive count corresponding to the access point AP3 is subtracted by 1 since the access point AP3 is not detected in the second scanning operation.

The displayed data list includes access points AP1, AP2, AP3, AP4 and AP5, as follows:

| Name | Access Point ID | Signal Strength | Alive Count | Data List |
|---|---|---|---|---|
| AP1 | 00000001 | −61 dbm | 3 | AP1, AP2, |
| AP2 | 00000002 | −60 dbm | 3 | AP3, AP4, |
| AP3 | 00000003 | NA | 2 | AP5 |
| AP4 | 00000004 | −78 dbm | 3 | |
| AP5 | 00000005 | −80 dbm | 3 | |

It is assumed that the wireless access points detected in a third scanning operation is AP1, AP2 and AP6, wherein the alive count respectively corresponding to the access point AP3, AP4 and AP5 is subtracted by 1 since the access points AP3, AP4 and AP5 are not detected in the third scanning operation. The displayed data list includes access points AP1, AP2, AP3, AP4, AP5 and AP6, as follows:

| Name | Access Point ID | Signal Strength | Alive Count | Data List |
|---|---|---|---|---|
| AP1 | 00000001 | −62 dbm | 3 | AP1, AP2, |
| AP2 | 00000002 | −59 dbm | 3 | AP3, AP4, |
| AP3 | 00000003 | NA | 1 | AP5, AP6 |
| AP4 | 00000004 | NA | 2 | |
| AP5 | 00000005 | NA | 2 | |
| AP6 | 00000006 | −70 dbm | 3 | |

It is assumed that the wireless access points detected in a fourth scanning operation is AP1, AP2 and AP5. The displayed data list follows:

| Name | Access Point ID | Signal Strength | Alive Count | Data List |
|---|---|---|---|---|
| AP1 | 00000001 | −61 dbm | 3 | AP1, AP2, |
| AP2 | 00000002 | −60 dbm | 3 | AP4, AP5, |
| AP3 | 00000003 | NA | 0 | AP6 |
| AP4 | 00000004 | NA | 1 | |
| AP5 | 00000005 | −68 dbm | 3 | |
| AP6 | 00000006 | NA | 2 | |

In the fourth scanning operation, the alive count respectively corresponding to the access point AP3, AP4 and AP6 is subtracted by 1 since the access points AP3, AP4 and AP6 are not detected in the fourth scanning operation. The alive count corresponding to the access point A5 is reset to the default value 3 since the access point AP5 is detected again. The access point AP3 is removed from the data list since the alive count corresponding to the access point AP3 equals to 0. By this manner, related hardware is not needed to be modified, and users will not be aware of inconsistent scanning results.

Figure 4A:
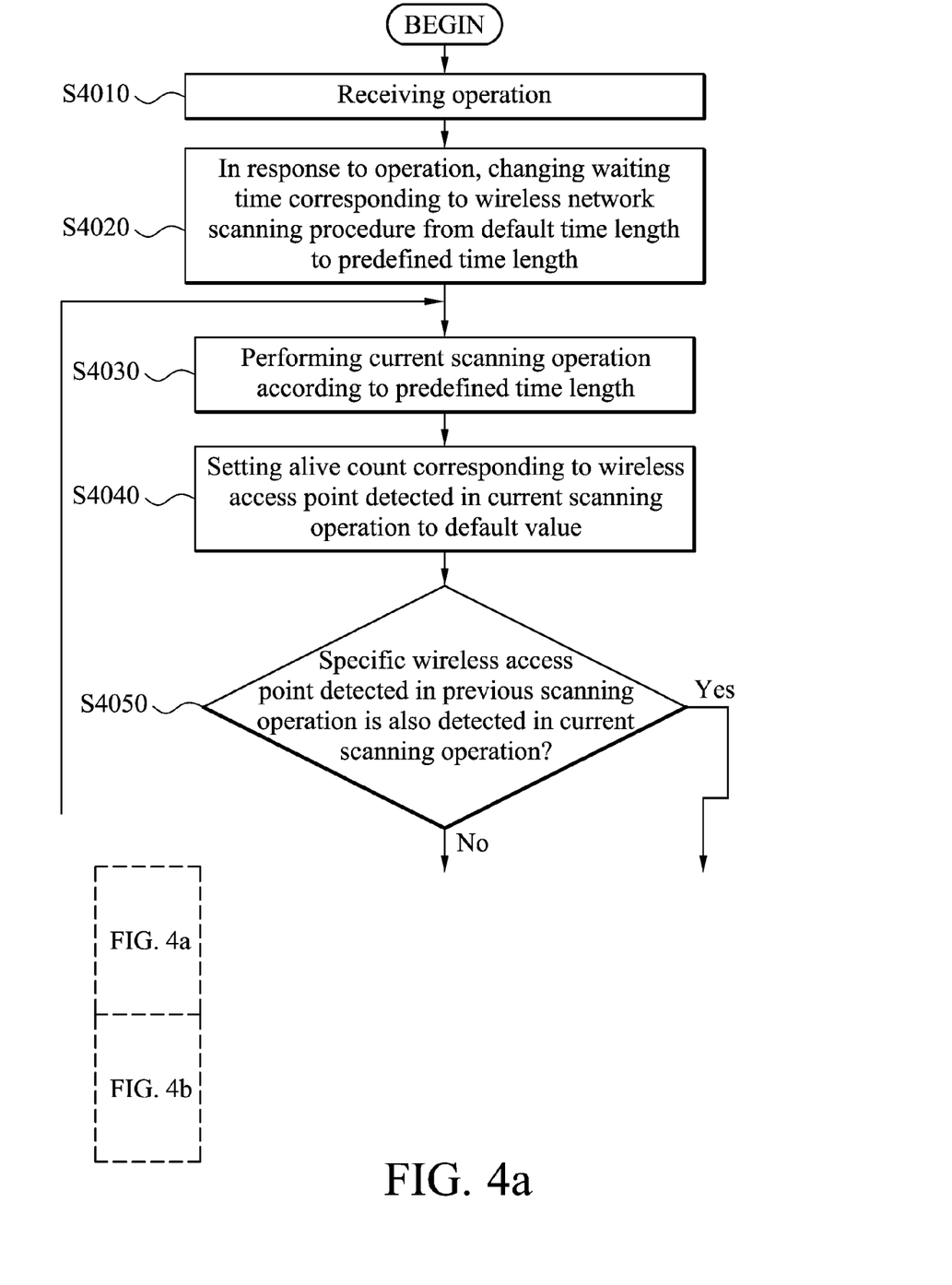
Figure 4B:
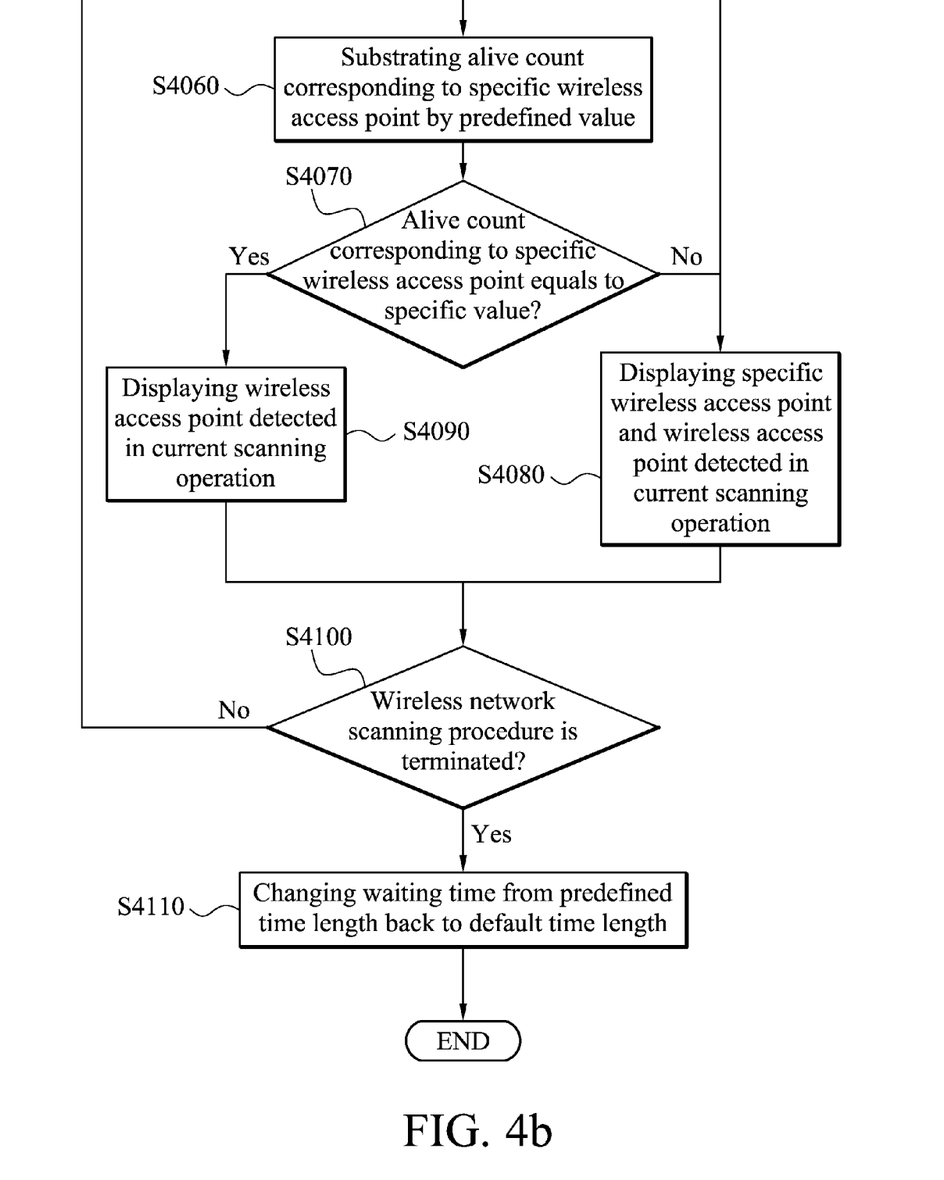

FIGS. 4 (4A and 4B) is a flowchart of another embodiment of a scanning method for wireless networks of the invention. The scanning method for wireless networks can be used in an electronic device having wireless network connection capability, such as a mobile phone, notebook, game host, or any kind of portable devices. In this embodiment, in response to an operation, the scanning time for each wireless network channel will be adjusted. Further, an alive count can be provided for each wireless access point, and the alive count can be used to determine whether to display the corresponding wireless access point in related interfaces.

In step S4010, an operation is received, and in step S4020, in response to the operation, at least a waiting time corresponding to a wireless network scanning procedure is changed from a default time length to a predefined time length. Similarly, in some embodiments, the operation may be, the opening of a scanning interface for wireless networks. That is, when the scanning interface for wireless networks is opened by users, step S4020 is performed, such that the waiting time is changed from the default time length to the predefined time length. It is noted that, in some embodiments, the predefined time length may be greater than the default time length, but the present invention is not limited thereto. Additionally, it is understood that, the wireless network scanning procedure may be an active scanning procedure or a passive scanning procedure, and a default minimum waiting time and a default maximum waiting time can be set for the active scanning procedure and the passive scanning procedure, respectively. In some embodiments, the minimum waiting time corresponding to the scanning procedure can be changed from a default minimum waiting time to a predefined minimum waiting time, and the maximum waiting time corresponding to the scanning procedure can be changed from a default maximum waiting time to a predefined maximum waiting time. Additionally, in some embodiments, the above predefined time length (predefined minimum waiting time and/or predefined maximum waiting time) can be set via a user interface.

When the waiting time corresponding to the wireless network scanning procedure is set, in step S4030, a current scanning operation is performed according to the predefined time length to detect at least one wireless access point in a wireless network. In step S4040, the alive count corresponding to the respective wireless access point detected in the current scanning operation is set to a default value. It is understood that, the default value of the alive count can be adjusted according to various wireless network environments, applications and requirements. In step S4050, it is determined whether at least one specific wireless access point detected in a previous scanning operation preceding the current scanning operation is also detected in the current scanning operation. If the specific wireless access point detected in a previous scanning operation is also detected in the current scanning operation (Yes in step S4050), the procedure goes to step S4080. If the specific wireless access point detected in a previous scanning operation is not detected in the current scanning operation (No in step S4050), in step S4060, the alive count corresponding to the specific wireless access point is subtracted by a predefined value, such as 1, and in step S4070, it is determined whether the alive count equals to a specific value, such as 0. If the alive count does not equal to the specific value (No in step S4070), in step S4080, the specific wireless access point and the at least one wireless access point detected in the current scanning operation are displayed via an interface. If the alive count equals to the specific value (Yes in step S4070), in step S4090, the at least one wireless access point detected in the current scanning operation is displayed via the interface.

Then in step S4100, it is determined whether the wireless network scanning procedure is terminated or not. When the wireless network scanning procedure is not terminated (No in step S4100), the procedure returns to step S4030, a next scanning operation is performed according to the predefined time length. Similarly, in some embodiments, the system can maintain at least one data list for recording the wireless access points needed to be displayed. In some embodiments, the data list can record the wireless access points/specific wireless access points detected in a previous scanning operation. The wireless access points detected in the current scanning operation will be added to the data list. In the data list, the alive count corresponding to the repeatedly detected wireless access point is updated to the default value, the alive count corresponding to the wireless access point in the data list, which is not detected in the current scanning operation is subtracted by the predefined value, and the wireless access point has the alive count equaling to the specific value will be removed from the data list. When the wireless network scanning procedure is terminated (Yes in step S4100), in step S4110, the waiting time corresponding to the wireless network scanning procedure is changed from the predefined time length back to the default time length. For example, the minimum waiting time corresponding to the scanning procedure can be changed from the predefined minimum waiting time back to the default minimum waiting time, and the maximum waiting time corresponding to the scanning procedure can be changed from the predefined maximum waiting time back to the default maximum waiting time.

Therefore, the scanning methods and systems for wireless networks can perform additional management functions for scanning of access points in wireless networks. In the present application, without modifying related modules and hardware, the efficiency of wireless network scanning can be improved, and the power required for the wireless scanning procedure can be accordingly reduced.

Scanning methods for wireless networks, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A scanning method for wireless networks for use in an electronic device, comprising:
   receiving an operation initiating a wireless network scanning procedure;
   in response to the operation, changing at least a waiting time corresponding to the wireless network scanning procedure from a default time length to a predefined time length;
   performing the wireless network scanning procedure according to the predefined time length, wherein the step of performing the wireless network scanning procedure according to the predefined time length comprises the steps of:
      determining whether a specific wireless access point detected in a second scanning operation is also detected in a first scanning operation, wherein the second scanning operation is performed preceding the first scanning operation;
      if the specific wireless access point detected in the second scanning operation is not detected in the first scanning operation, subtracting an alive count corresponding to the specific wireless access point by a predefined value;
      determining whether the alive count corresponding to the specific wireless access point equals to a specific value, wherein the specific value is a preset integer; and
      if the alive count does not equal to the specific value, displaying the specific wireless access point having the alive count not equal to the specific value and at least one wireless access point detected in the first scanning operation via a user interface; and
   when the wireless network scanning procedure is terminated, changing the waiting time from the predefined time length back to the default time length.

2. The method of claim 1, wherein the operation is used to open a scanning interface for wireless networks.

3. The method of claim 1, wherein the at least one waiting time comprises a minimum waiting time and a maximum waiting time.

4. The method of claim 1, further comprising setting the predefined time length via a user interface, wherein the predefined time length is greater than the default time length.

5. The method of claim 1, wherein the step of performing the wireless network scanning procedure according to the predefined time length further comprises a step of setting the alive count corresponding to the wireless access point detected in the first scanning operation as a default value.

6. The method of claim 1, wherein the wireless access point detected in the first scanning operation and the specific wireless access point detected in the second scanning operation are recorded in a data list, and the specific wireless access point is removed from the data list if the alive count corresponding to the specific wireless access point equals to the specific value.

7. A scanning method for wireless networks for use in an electronic device, comprising:
performing a first scanning operation to detect at least one wireless access point in a wireless network;
determining whether a specific wireless access point detected in a second scanning operation is also detected in the first scanning operation, wherein the second scanning operation is performed preceding the first scanning operation;
if the specific wireless access point detected in the second scanning operation is not detected in the first scanning operation, subtracting an alive count corresponding to the specific wireless access point by a predefined value;
determining whether the alive count corresponding to the specific wireless access point equals to a specific value, wherein the specific value is a preset integer; and
if the alive count does not equal to the specific value, displaying the specific wireless access point having the alive count not equal to the specific value and at least one wireless access point detected in the first scanning operation via a user interface,
wherein the wireless access point detected in the first scanning operation and the specific wireless access point detected in the second scanning operation are recorded in a data list, and the specific wireless access point is removed from the data list if the alive count corresponding to the specific wireless access point equals to the specific value.

8. The method of claim 7, further comprising setting the alive count corresponding to the wireless access point detected in the first scanning operation as a default value.

9. A scanning system for wireless networks for use in an electronic device, comprising:
a reception unit receiving an operation initiating a wireless network scanning procedure;
a wireless network connection unit; and
a processing unit, in response to the operation, changing at least a waiting time corresponding to a the wireless network scanning procedure from a default time length to a predefined time length, performing the wireless network scanning procedure according to the predefined time length via the wireless network connection unit, and when the wireless network scanning procedure is terminated, changing the waiting time from the predefined time length back to the default time length,
wherein in the wireless network scanning procedure based on the predefined time length, the processing unit determines whether a specific wireless access point detected in a second scanning operation is also detected in a first scanning operation, wherein the second scanning operation is performed preceding the first scanning operation, if the specific wireless access point detected in the second scanning operation is not detected in the first scanning operation, subtracts an alive count corresponding to the specific wireless access point by a predefined value, determines whether the alive count corresponding to the specific wireless access point equals to a specific value, wherein the specific value is a preset integer, and if the alive count does not equal to the specific value, displays the specific wireless access point having the alive count not equal to the specific value and at least one wireless access point detected in the first scanning operation via a user interface.

10. The system of claim 9, wherein the operation is used to open a scanning interface for wireless networks.

11. The system of claim 9, wherein the at least one waiting time comprises a minimum waiting time and a maximum waiting time.

12. The system of claim 9, wherein the processing unit further receives the setting of the predefined time length via a user interface, wherein the predefined time length is greater than the default time length.

13. The system of claim 9, wherein the processing unit further sets the alive count corresponding to the wireless access point detected in the first scanning operation as a default value.

14. The system of claim 9, wherein the wireless access point detected in the first scanning operation and the specific wireless access point detected in the second scanning operation are recorded in a data list, and the specific wireless access point is removed from the data list if the alive count corresponding to the specific wireless access point equals to the specific value.

15. A scanning system for wireless networks for use in an electronic device, comprising:
a display unit;
a wireless network connection unit; and
a processing unit performing a first scanning operation to detect at least one wireless access point in a wireless network via the wireless network connection unit, determining whether a specific wireless access point detected in a second scanning operation is also detected in the first scanning operation, wherein the second scanning operation is performed preceding the first scanning operation, if the specific wireless access point detected in the second scanning operation is not detected in the first scanning operation, subtracting an alive count corresponding to the specific wireless access point by a predefined value, determining whether the alive count corresponding to the specific wireless access point equals to a specific value, wherein the specific value is a preset integer, and if the alive count does not equal to the specific value, displaying the specific wireless access point having the alive count not equal to the specific value and at least one wireless access point detected in the first scanning operation via a user interface.

16. The system of claim 15, wherein the processing unit further sets the alive count corresponding to the wireless access point detected in the first scanning operation as a default value.

17. The system of claim 15, wherein the wireless access point detected in the first scanning operation and the specific wireless access point detected in the second scanning operation are recorded in a data list, and the specific wireless access point is removed from the data list if the alive count corresponding to the specific wireless access point equals to the specific value.

* * * * *